US009551295B2

(12) United States Patent
Gormley

(10) Patent No.: US 9,551,295 B2
(45) Date of Patent: Jan. 24, 2017

(54) VARIABLE AREA FAN NOZZLE POSITION AND SKEW SENSING

(71) Applicant: Rohr, Inc., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 673 days.

(21) Appl. No.: 13/949,945

(22) Filed: Jul. 24, 2013

(65) Prior Publication Data

US 2014/0026536 A1 Jan. 30, 2014

Related U.S. Application Data

(60) Provisional application No. 61/675,293, filed on Jul. 24, 2012.

(51) Int. Cl.
*F02K 1/09* (2006.01)
*F02K 1/15* (2006.01)
(52) U.S. Cl.
CPC .. *F02K 1/15* (2013.01); *F02K 1/09* (2013.01)

(58) Field of Classification Search
CPC ............... F02K 1/09; F02K 1/15; F02K 1/50; F02K 1/64; F02K 1/70; F02K 1/72; F02K 1/76
See application file for complete search history.

(56) References Cited

U.S. PATENT DOCUMENTS

| 8,235,325 B2* | 8/2012 | Schafer | F01D 17/02 244/53 R |
| 8,511,973 B2* | 8/2013 | Ramlaoui | B64D 29/06 415/128 |

* cited by examiner

*Primary Examiner* — Arun Goyal
(74) *Attorney, Agent, or Firm* — O'Shea Getz P.C.

(57) ABSTRACT

Systems, devices, and methods are presented for detecting a misaligned or otherwise skewed variable area fan nozzle (VAFN) that is mounted on a thrust reverser sleeve of an aircraft engine. Rods project from different parts around the arcuate VAFN, the rods having patterns at their ends. In normal operation when the thrust reverser is stowed, the rods project over the thrust reverser into a fixed area of the engine. Sensors in the fixed area determine the position of the VAFN from the patterns on the rods. When the thrust reverser deploys, the rods are pulled aft with the VAFN, which is mounted on the thrust reverser sleeve, and separate from the sensors. When the thrust reverser stows, the rods move forward with the VAFN and re-engage with the sensors. Repeating patterns on the rods allow for simple, relatively low-cost sensors to read their relative positions.

19 Claims, 9 Drawing Sheets

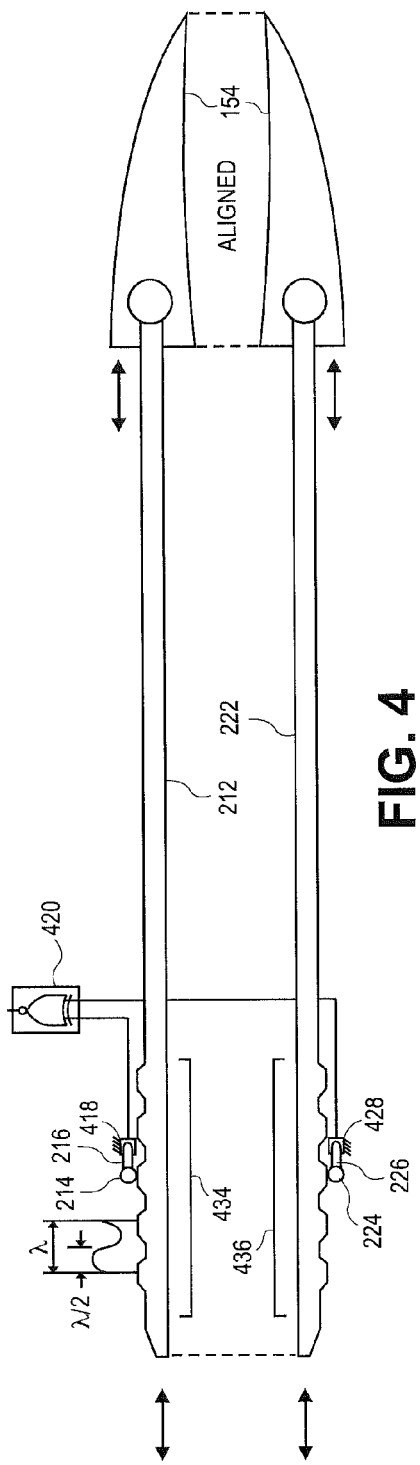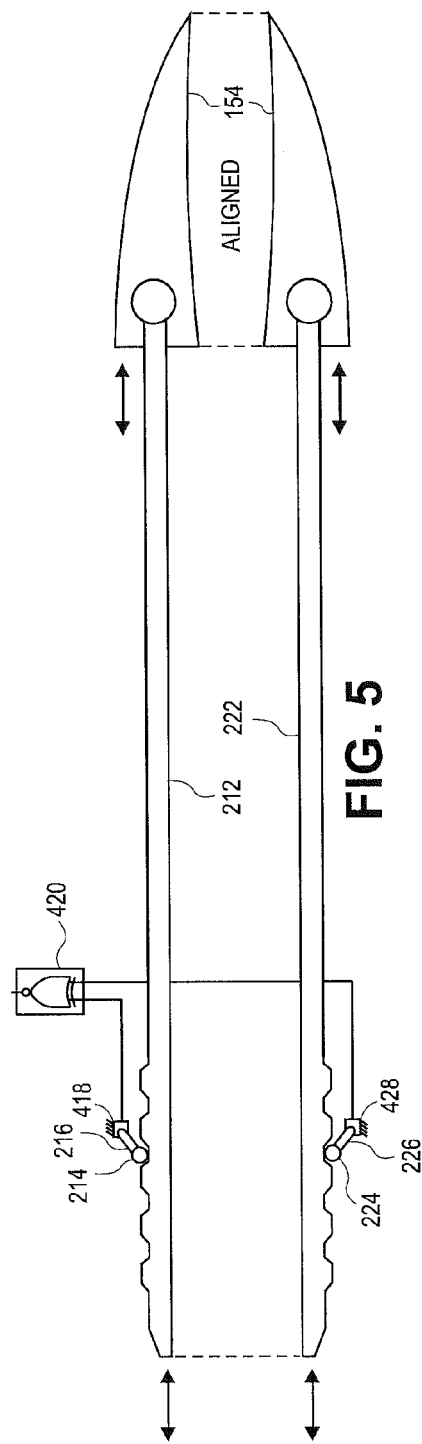

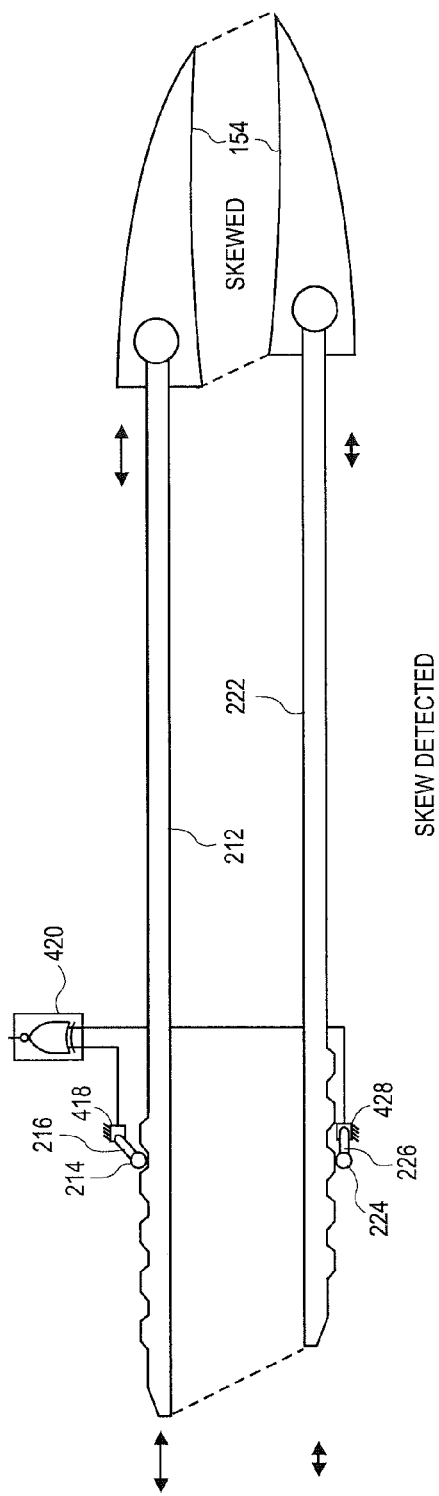
FIG. 6 SKEW DETECTED
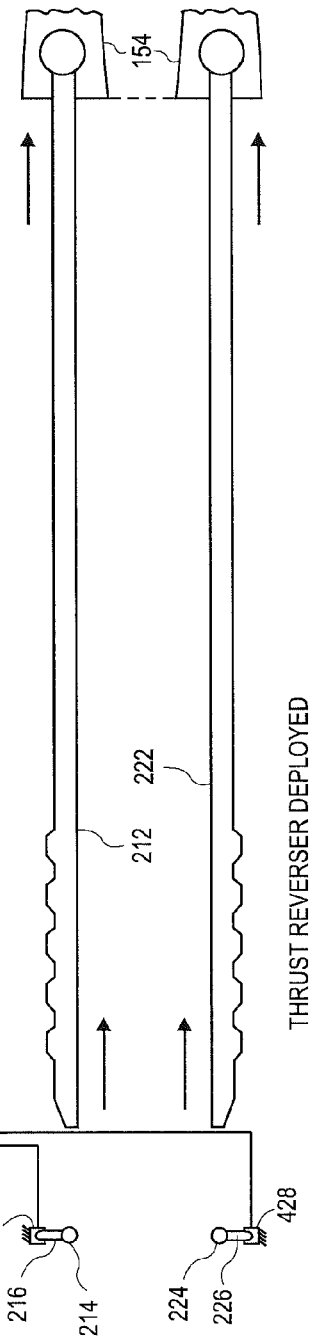
FIG. 7 THRUST REVERSER DEPLOYED

VARIABLE AREA FAN NOZZLE POSITION AND SKEW SENSING

This application claims priority to U.S. Patent Appln. No. 61/675,293 filed Jul. 24, 2012.

BACKGROUND

1. Field of the Invention

This disclosure relates generally to nacelles for aircraft turbofan engines and, more particularly, to a nacelle having a variable-area fan nozzle (VAFN) that moves during thrust reverser deployment.

2. Description of the Related Art

Typical aircraft turbofan jet engines include an engine core, a nacelle that surrounds the engine core, and a fan that draws in a flow of air that is split into a bypass airflow and an engine core airflow. The nacelle provides a bypass duct that surrounds the engine core. The bypass airflow is transported through the bypass duct. The nacelle is configured to promote laminar flow of air through the bypass duct. The engine core includes a multi-stage compressor to compress the engine core airflow, a combustor to add thermal energy to the compressed engine core airflow, and a turbine section downstream of the combustor to produce mechanical power from the engine core airflow. The typical turbine section has two and sometimes three turbine stages. The turbine stages are used to drive the compressor and the fan. After exiting from the turbine section, the engine core airflow exits the nacelle through an exhaust nozzle at the aft end of the engine.

Modern aircraft employ turbofan variants of gas turbine engines that have a low fan pressure ratio (FPR) and high bypass ratio (BPR) for a bypass duct of the engine. As turbofan engine technology has matured, designers have stretched the associated technologies to minimize weight, cost, and maintenance while maximizing efficiency. Because of the extreme limits to which these engines are designed, and the valuable commercial interest in having the most efficient product available, even incremental improvements are sought after in the design of commercial turbofan engines.

One approach for optimizing the performance of an engine over various flight conditions involves varying the fan nozzle exit area. By selectively varying the fan nozzle's exit area during flight, an engine's bypass flow characteristics can be adjusted to better match a particular flight condition, for example, by optimizing the FPR relative to the particular thrust level being employed. For example, a variable area fan nozzle (VAFN) assembly that forms a rear outer portion of the bypass duct can include an airfoil that is moved aft into a VAFN flow position so as to open an additional bypass flow that exits the nacelle forward of the VAFN assembly. That is, an opening is created between the translatable sleeve and the VAFN airfoil, such that an airflow in the bypass duct is split into a first flow portion that remains in the bypass duct and moves past the airfoil, and a second flow portion that exits the bypass duct through the VAFN opening and over an outer surface of the airfoil. Optimum performance is achieved when the VAFN is properly aligned with the remainder of the nacelle throughout all flight regimes. In other words, the VAFN should not be skewed vis-á-vis the nacelle during flight.

In a turbofan engine, the fan typically produces a majority of the thrust produced by the engine. The bypass airflow can be used to produce reverse thrust, typically employed during landing. A thrust reversing apparatus that forms a portion of the nacelle selectively reverses the direction of the bypass airflow to generate reverse thrust. During normal engine operation, the bypass airflow may or may not be mixed with the engine core airflow exhaust prior to exiting the engine nacelle assembly. During thrust reverse operation, a translatable sleeve is moved from a stowed position to a deployed position to expose a cascade assembly, and blocker doors are deployed into the bypass duct. In this deployed position, the blocker doors redirect the airflow in the bypass duct to exit the nacelle out the cascade assembly.

Some VAFN systems function by adjusting the VAFN using actuators that are independent of the thrust reverser sleeve actuators. The trailing edge of a translating sleeve on a cascade-type thrust reverser is a space-limited environment within the nacelle, especially when used with a VAFN. Because of space limitations and the difficulty of running wires and associated mechanisms, actuators for adjusting the VAFN are typically mounted on nacelle non-moving structure forward of the thrust reverser.

There is a need in the art for lighter, more efficient, and more reliable engine components including VAFN assemblies.

SUMMARY

Generally, devices, systems, and methods are disclosed for detecting whether an aircraft engine variable area fan nozzle (VAFN) is skewed with respect to its nominal alignment and for stopping further movement of the VAFN (to minimize damage) based on such detection. Generally rigid rods are connected with the VAFN and span across the thrust reverser to a fixed area on the engine where sensors are located. The sensors compare the position of each rod with one another using a pattern on the rods. Upon thrust reverser deployment, the VAFN, moving aft with the thrust reverser, pulls the patterned rods clear from the sensors. Upon thrust reverser stowage, the patterned rods re-engage the sensors when the VAFN moves forward with the thrust reverser.

The pattern on the rods can repeat itself so that simple, relatively inexpensive sensors can be used. The pattern on each rod can include a track of physical notches or protrusions. A roller rolls along the track, moving up and down over the peaks and valleys created by the notches and protrusions. A crank, connected with the roller, transmits the movement to a flap that pivots in front of a proximity switch. If the rollers rolling over the different rods are both high or both low on the pattern, then the VAFN is not skewed and is allowed to move in normal operation. If one of the rollers is high and the other roller is low, then the VAFN is determined to be skewed, and movement of the VAFN is stopped. In the event of skew being detected, the engine can be put into a safe mode so that it does not enter modes or thrust levels that would injure itself or the VAFN.

Some embodiments of the present invention are related to a skew sensing apparatus for an aircraft engine VAFN. The apparatus includes an arcuate VAFN section having rods connected at opposite locations along an arc of the arcuate VAFN section, the arcuate VAFN section and rods configured to move fore and aft with respect to an engine. The apparatus also includes a translatable sleeve of a thrust reverser, the arcuate VAFN section supported by the translatable sleeve, and one or more sensors configured to determine, using the rods connected with the arcuate VAFN section, if the arcuate VAFN section is skewed with respect to the engine. The rods are configured to clear away from the one or more sensors upon deploying the translatable sleeve of the thrust reverser and re-engage the one or more sensors upon stowing the translatable sleeve of the thrust reverser.

Some embodiments are related to a skew sensing apparatus for an aircraft engine VAFN. The apparatus includes an arcuate VAFN section, a translatable sleeve of a thrust reverser, the arcuate VAFN section supported by the translatable sleeve, a first rod connected with a portion of the VAFN section and guided across the translatable sleeve of a thrust reverser, the first push rod having a first pattern along a length of the first rod, a second rod connected with a portion of the VAFN section and guided across the translatable sleeve of the thrust reverser, the second push rod having a second pattern along a length of the second rod, a first sensor adapted to sense a position of the first rod using the first rod pattern, a second sensor adapted to sense a position of the of the second rod using the second rod pattern, and a circuit configured to compare the positions of the first and second rods based on information provided by the first and second sensors.

The first and second rods can be configured to move clear of the first and second sensors when the translatable sleeve of the thrust reverser moves to its deployed positions, and can also be configured to re-engage the first and second sensors when the translatable sleeve of the thrust reverser moves to its stowed position. The first pattern of the first rod can include physical notches or protrusions on the first rod, and the first sensor can include a position-sensing switch. The position-sensing switch can include a proximity sensor, and the apparatus can further include a roller configured to roll against the first pattern of the first rod, a crank connected with the roller, an axle of the crank extending through a beam, and a flap connected with the crank on a side of the beam opposite the roller, the flap positioned proximate the proximity sensor.

Embodiments can relate to a method of sensing skew of an aircraft engine VAFN. The method can include moving an arcuate VAFN section fore or aft, the VAFN section supported by a translatable sleeve of a thrust reverser, the VAFN section having a portion connected with a first rod and a portion connected with a second rod, each rod having a pattern along its respective length, sensing, using a first sensor, a position of the first rod using the first rod pattern, sensing, using a second sensor, a position of the second rod using the second rod pattern, comparing the sensed positions of the first and second rods, and stopping or preventing movement of the VAFN section based on the comparison.

The method can include moving (or dis-engaging) the first and second rods clear of the first and second sensors, respectively, upon deploying the translatable sleeve of the thrust reverser, and re-engaging the first and second rods with the first and second sensors, respectively, upon stowing the translatable sleeve of the thrust reverser.

The first pattern of the first rod can include physical notches or protrusions on the first rod. The first sensor can include a position-sensing switch. The method can further include rolling the roller over the physical notches or protrusions on the first rod. The first pattern can include patterns of conductive or magnetic strips, magnets, visible markings, or other patterns readable by a sensor.

Other features and advantages of the present invention should be apparent from the following description of the preferred embodiments, which illustrate, by way of example, the principles of the invention.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIG. 4 illustrates a determination of an aligned VAFN in accordance with an embodiment.

FIG. 5 illustrates a determination of an aligned VAFN in accordance with an embodiment.

FIG. 6 illustrates a determination of a skewed VAFN in accordance with an embodiment.

FIG. 7 illustrates disengaged rods due to thrust reverser deployment in accordance with an embodiment.

DETAILED DESCRIPTION

Figure 1:
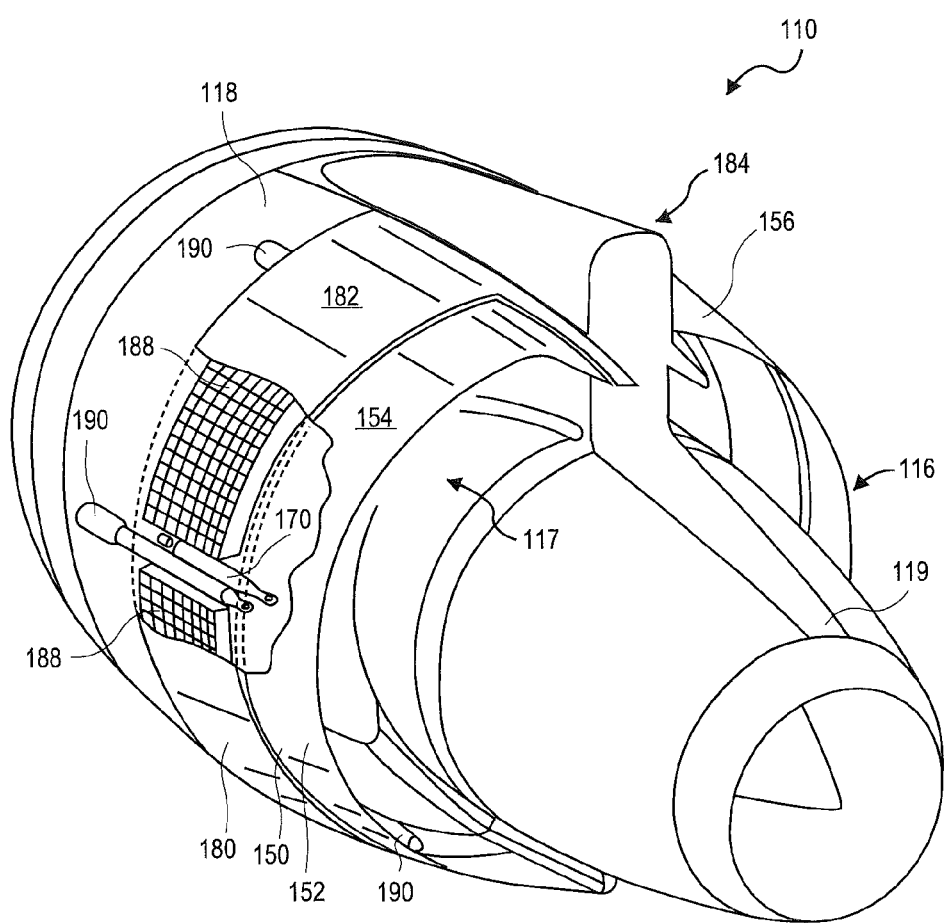
FIG. 1 illustrates an aircraft engine with a thrust reverser and VAFN in accordance with an embodiment.

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

A VAFN assembly may employ an arc-shaped nozzle, generally in the form of a large half-cylinder. The nozzle is moved fore and aft with respect to the engine using actuators attached to different points around the half-cylinder. If the actuators do not move the half-cylinder at the same rate, or if one of the actuators does not move, there is a risk that the half-cylinder will become cocked askew. That is, the half-cylinder will be slanted when it should be straight. If the half-cylinder is skewed with respect to its tracks and the thrust reverser upon which it is mounted, moving it further could cause damage. For example, it could bind up with metal track parts, tear into the thrust reverser skin, or otherwise crumple into itself. Furthermore, the exit area of the bypass air would not be calibrated correctly, possibly upsetting backpressures into the engine.

The VAFN assembly is commonly mounted to a thrust reverser sleeve. The thruster reverser sleeve is called upon to rapidly move around 2-3 feet, generally within a second or two, during deployment. Thrust reverser deployment can be at a critical time during flight, such as just after touchdown while an airplane is rolling down a runway to a stop. The thrust reverser is stowed at a similar rate, rapidly closing off the cascades and returning bypass air out the rear of the engine. Rapid closure of the thrust reverser may be critical when forward thrust is needed quickly for rapid slowing or for a touch and go procedure.

A problem encountered with having to move a VAFN assembly mounted to a moving thrust reverser is the routing of actuation and sensing cables. Upon thrust reverser deployment, the cables need to rapidly expand across 2-3 feet in a second or two and then collapse at about the same break speed rate when the thrust reverser has stowed. This must be done reliably on a jostling, on-wing environment immediately after touchdown. It has been empirically determined that coiled cables do not work reliably. When their ends rapidly come together, the stretched coils in the middle bunch and flop around instead of coiling neatly. Automatic wire retraction reels are also unreliable. The rotational inertia of the reels keep them from reacting as quickly as desired. Existing coiled wires and automatic retraction reels can have a higher rate of failure than is acceptable for commercial turbofan engines.

Disclosed herein is a means of sensing motion of a VAFN assembly across a translating thrust reverser sleeve to the fixed structure of the engine in a benign, protected area where sufficient space exists. An embodiment utilizes a transfer rod attached to a VAFN section. The transfer rod rides within a track located and attached to the translating sleeve. The rod contacts a roller and crank on the hinge/latch beam, which in turn transfers the motion to another other side of the beam(s) where proximity sensors are located. By varying the profile of the transfer rod, position of the VAFN section can be determined. The embodiment can also be used to sense skew of the VAFN assembly.

As used herein, "VAFN skew" includes a condition in which the top and bottom of the VAFN assembly are in different positions. VAFN skew can be sensed by employing the rod-and-track hardware and associated sensors discussed below in multiple locations and comparing the output from each sensor.

When the thrust reverser translating sleeve is deployed, the transfer rod and track become temporarily disconnected. When the thrust reverser translating sleeve is stowed, the transfer rod and track re-engage the sensors. Because the rod is relatively rigid, it does not flop around.

As used herein, "deploying" a thrust reverser assembly includes any time during which a thrust reverser assembly has moved from its fully stowed position or as otherwise known in the art. For example, a thrust reverser assembly may be considered to be deploying when its thrust reverser sleeves have just begun to move from their fully stowed rest position. The thrust reverser assembly is also considered deploying when the thrust reverser assembly has fully deployed and all of its cascades are open to the fan airstream.

As used herein, "stowing" a thrust reverser asssembly includes any time during which a thrust reverser assembly has moved from its fully deployed position or as otherwise known in the art. For example a thrust reverser assembly may be considered to be stowing when its thrust reversers have just begun to move from their fully deployed rest position. The thrust reverser assembly is also considered stowing when the thrust reverser assembly has been fully stowed and its sleeve is aligned with the rest of the nacelle for cruise.

Technical advantages of embodiments of the present invention are many A transfer rod system moves the sensors from the VAFN assembly, where there is little room, to a protected area in a fixed part of the engine. The transfer rods can clear away from the sensors upon the thrust reverser deploying and then rapidly, and reliably, seat back and re-engage their sensors when the thrust reverser assembly is stowed. A pattern on the end of the transfer rods allows a reading sensor to remain in a fixed location while the patterned rod moves beneath it. A repeating pattern, such as a series of notches, protrusions, or ink markings, can simplify the complexity of the sensors to be used. The repeating pattern has a wavelength of repetition. For patterns having notches and protrusions, as an example, a simple and reliable proximity sensor can be used. As long as a half-wavelength of the repeating pattern is less than the threshold distance allowed for indicating a skewed configuration of the VAFN sleeves, skew can be detected by comparing signals from the sensors, and the motors can be stopped before damage is done to the engine. A roller-and-crank assembly can roll over notches and protrusions, in turn positioning a flap near or far from a proximity sensor on the other side of a beam. This can isolate the proximity sensors from the extreme environment on the other side of the beam.

A "half-wavelength" of a repeating pattern includes a length equal to half the length of the portion of the pattern that is repeated to make the whole pattern, or as otherwise known in the art. For example, a half-wavelength of a 12-inch pattern of 6 repeating pairs of peaks and valleys is one half of a 2-inch section of a peak and a valley, i.e., 1 inch.

To "move away" or to clear or disengage from sensors generally involves moving from an area that the sensor can read to an area that the sensor cannot read, or as otherwise known in the art. For example, a rod with a notches and grooves can move away from a roller and crank-based sensor by moving its end beyond the reach of the roller so that the roller can no longer roll over the notches and grooves. As another example, a rod with magnets can move away from a magnetic sensor by moving its magnets to a position where movements of the rod do not result in the magnets being detected by the magnetic sensors.

To "re-engage" or mate with sensors includes moving from an area that the sensor cannot read to an area that the sensor can read, or as otherwise known in the art. For example, an ink-marked rod can re-engage with an optical sensor when the markings come back within view of the optical sensor.

FIG. 1 illustrates aircraft engine 110 with an associated nacelle assembly 118. The nacelle assembly 118 includes a thrust reverser assembly 180 and a VAFN assembly 150 constructed in accordance with an embodiment. The engine 110 includes an engine core 116 and a core cowl 119.

The thrust reverser assembly 180 includes an arcuate first sleeve or cowl section 182 and an opposed, arcuate second sleeve or cowl section 184. Peripherally-spaced thrust reverser sleeve actuators 190 are mounted on or in the nacelle 118 and are shown in the figure as having retracted or otherwise stowed thrust reverser sleeves 182 and 184. The thrust reverser sleeve sections 182 and 184 are axially translatable. When deployed, the translated sleeves expose cascade vanes 188 of the thrust reverser assembly 180, shown in a cut-away view in the figure. As is known to those skilled in the art, the nacelle can have more than two thrust reverser sleeves and other arrangements for moving the sleeves relative to the nacelle.

The variable area fan nozzle (VAFN) assembly 150 is mounted on the aft end of the thrust reverser assembly 180. The VAFN assembly 150 includes a translating fan nozzle 152 having arcuate ring sections or airfoils 154 and 156. The VAFN ring sections 154 and 156 are axially translatable with respect to the engine. In operation, the ring actuators 170 move the VAFN ring sections or airfoils 154 and 156 fore and aft relative to the engine, varying the exit area of the bypass duct 117. As is known to those skilled in the art, the nacelle can have more than two VAFN ring sections and other arrangements for moving the ring sections relative to the engine.

Figure 2:
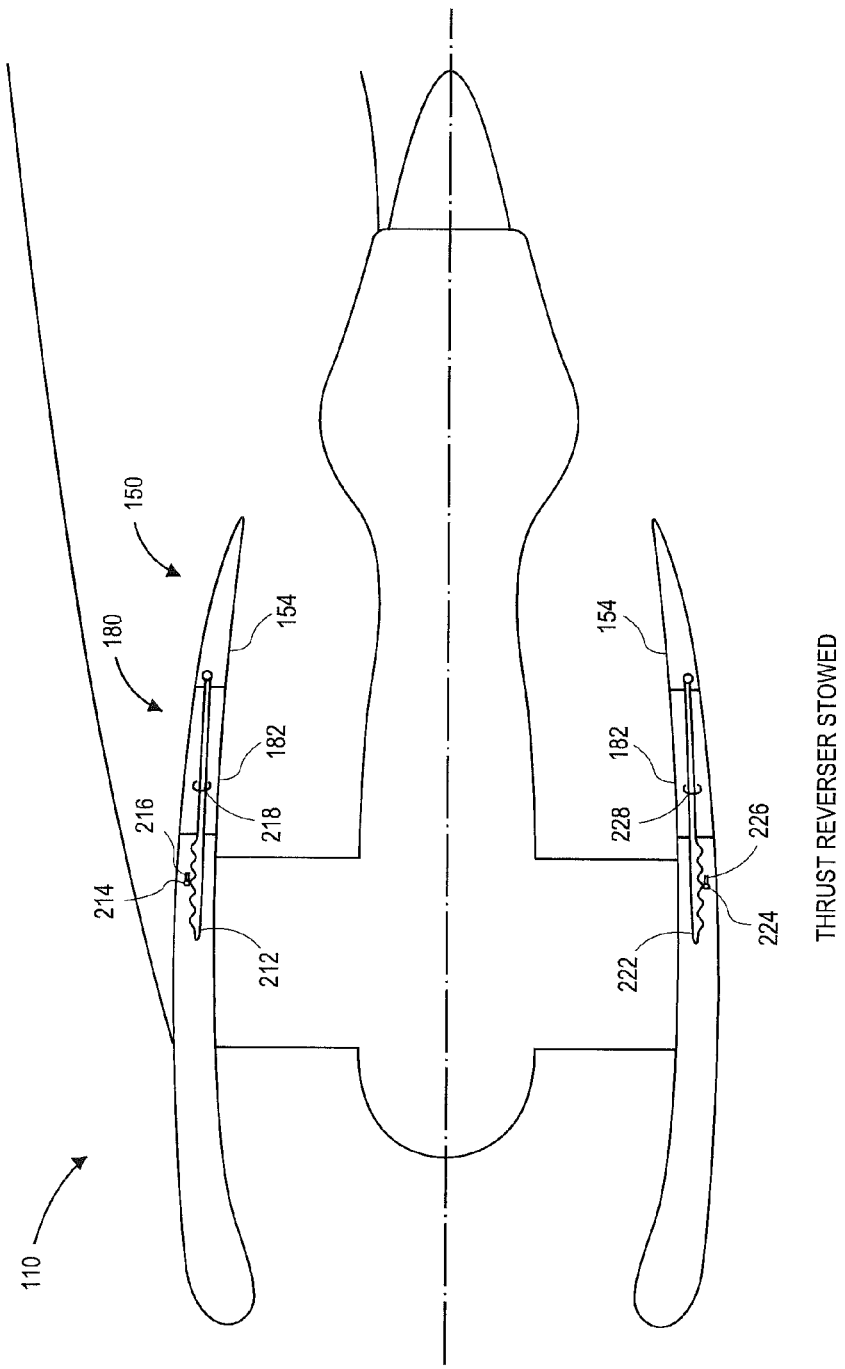
FIG. 2 illustrates a rod spanning across a stowed thrust reverser in accordance with an embodiment.

FIG. 2 illustrates a rod spanning from the VAFN assembly 150 across the stowed thrust reverser 180 in accordance with an embodiment.

At the top of the engine 110, a rod 212 is connected with with the arcuate VAFN section 154. The rod 212 is guided by a guide 218, which is supported by a thrust reverser sleeve 182. As the VAFN section 154 moves back and forth in operation, typically several inches, a mechanical track pattern on the rod moves underneath a roller 214. The roller 214 is connected to a crank 216, which transmits the movement caused by the moving track pattern through an axle to a sensor, which is described further below (not shown in FIG. 2).

In a similar fasion, on the bottom of the engine 110, a rod 222 is connected with the arcuate VAFN section 154. The rod 222 is guided by a guide 228, which is supported by the thrust reverser sleeve 182. A mechanical track pattern on rod 222 moves back and forth under a roller 224. The roller 224 is connected to a crank 226, which transmits the movement caused by the moving track pattern through an axle to a sensor, which is described further below (not shown in FIG. 2).

The use of "top," "bottom," "under," "underneath," "up," and other such terms is not to be construed as limiting an alignment with respect to a gravitational vector, horizon, or aircraft. The terms are to be construed in a broader sense, such as against or proximal to, or as otherwise known in the art.

Figure 3:
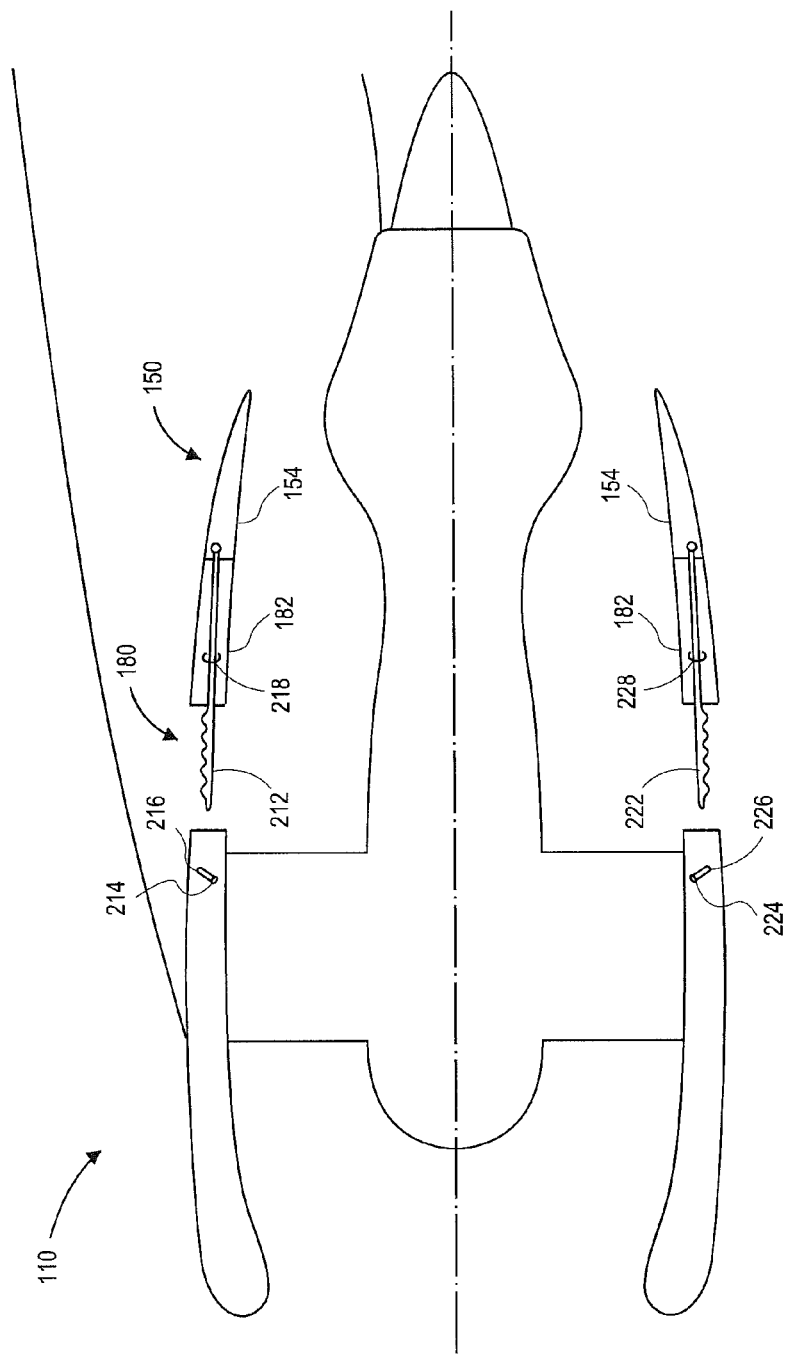
FIG. 3 illustrates a rod disengaged by a deployed thrust reverser in accordance with an embodiment.

FIG. 3 illustrates a rod from the VAFN 150 assembly disengaged by the thrust reverser 180 as deployed, in accordance with an embodiment.

At the top of the engine 110, FIG. 3 shows the rod 212 has been pulled aft (e.g., 2-3 feet) with respect to the front of the engine and nacelle by the arcuate VAFN section 154, which is mounted on the deploying thrust reverser sleeve 182. The rod 212 is still guided by the guide 218, which is still supported by the thrust reverser sleeve 182.

In the deployed position of FIG. 3, the roller 214 no longer touches the rod 212 because the rod 212 has been moved away and cleared from it. The roller 214 and crank 216 are shown in a disengaged position, ready to re-engage with the rod 212 when it returns and its associated sleeve returns to the stowed position.

At the bottom of the engine 110, the rod 222 has also been pulled aft by the arcuate VAFN section 154. The rod 222 is still guided by the guide 228, which is still supported by the thrust reverser sleeve 182.

In FIG. 3, the roller 224 no longer touches the rod 222 because the rod 222 has been moved away and cleared from it. The roller 224 and crank 226 are shown in a disengaged position, ready to re-engage with the rod 222 when it returns.

Upon the thrust reverser sleeve 182 moving to the stowed position, the rods 212 and 222 move forward, kicking up or otherwise engaging with their respective rollers 214 and 224 by an oblique end. The rollers 214 and 224 can then resume rolling over the patterns on the rods, checking for skew.

FIGS. 4-5 illustrate a configuration for determining a skewed or unskewed VAFN assembly in accordance with an embodiment of the invention. As the VAFN section 154 moves fore and aft, the rods 212 and 222 move fore and aft with it.

The rods 212 and 222 have patterns 434 and 436, respectively, at their forward ends, distal to the VAFN section. In the exemplary embodiment, the patterns 434 and 436 are identical patterns to one another. They are also repeating patterns in that a valley and peak are repeated five times. The wavelength λ of the pattern can be measured as the distance between the centers of two adjacent peaks. A half-wavelength λ/2 of the pattern is one half of the wavelength.

The patterns 434 and 436 are shown as being mechanical in nature, having physical notches and protrusions. The rollers 214 and 224 roll over or otherwise engage their respective patterns 434 and 436, wobbling back and forth the cranks 216 and 226, respectively. The cranks 216 and 226 rotate through apertures, and their movements are sensed by the sensors 418 and 428, respectively.

The sensors 418 and/or 428 can include mechanical switches, conductive couplers, optical/infrared detectors, magnetic field detectors, and other sensing devices that produce output signals.

The output signals from the sensors 418 and 428 are compared using a circuit 420. In the exemplary embodiment, the circuit 420 performs an exclusive-OR (XOR) comparison of the two inputs and applies a NOT operation to the result. A high-level signal from the circuit 420 provides an affirmative result (i.e., "okay") that indicates proper operation and a non-skewed configuration; a low-level signal from the circuit provides a negative result that indicates a skew has been detected.

If both of the rollers are high, as in FIG. 4, then the output of the circuit 420 is high, indicating that the VAFN section 154 is aligned (i.e., not skewed). If both of the rollers are low, as in FIG. 5, the output of the circuit 420 is high, indicating that the VAFN section 154 is aligned. A skewed VAFN is detected when one of the rollers is high and the other roller is low, or any other condition in which the output of the circuits is not the same. The circuit outputs are considered the same, and indicative of a non-skewed condition, when their value is within plus-or-minus 0.5%, 1%, 2%, 3% 4%, 5%, 7%, 10%, 15%, 20%, 25%, or other tolerances as would be apparent to one of skill in the art.

FIG. 6 illustrates a determination of a skewed VAFN assembly in accordance with an embodiment. The figure has the same elements as the previous figures. However, the roller 214 is shown located down (in a valley) while the opposite roller 224 is located high (on a peak). Thus, the output of the XOR circuit 420 is low, indicating the the VAFN section 154 is misaligned, or skewed. A logic table is presented in Table 1 to show the outputs and their indications.

TABLE 1

|  | Top Rod Roller HIGH | Top Rod Roller LOW |
|---|---|---|
| Bottom Rod Roller - HIGH | okay | skew |
| Bottom Rod Roller - LOW | skew | okay |

Intermediate positions, such as those positions within certain tolerances, can be ignored, and the system can be set up so that only a full high combined value with a full low value registers a skew warning.

FIG. 7 illustrates disengaged rods due to thrust reverser deployment in accordance with an embodiment. The arcuate VAFN section 154 has moved aft with the thrust reverser (not shown in the figure) and has pulled the rods 212 and 222 aft with it. The rods 212 and 222 have been pulled away from and clear of rollers the 214 and 224, leaving the cranks 216 and 226 in a fully biased position.

Because in the case shown in FIG. 7, the rollers 214 and 224 are both low, the circuit 420 emits an affirmative or "okay" signal. This signal is emitted even though the rollers are not engaged with the sensors. When the thrust reverser is deployed, the VAFN assembly is typically locked so that it does not move in position. Therefore, it is unnecessary to detect skew until the thrust reverser is stowed.

Figure 8:
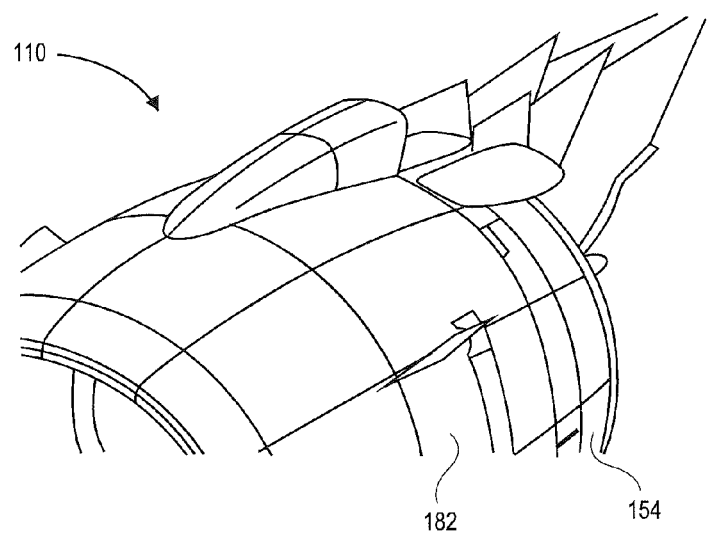
FIG. 8 illustrates an oblique view of an aircraft engine in accordance with an embodiment.

FIG. 8 illustrates an oblique view of aircraft engine 110 with thrust reverser sleeve 182 and arcuate VAFN section 154, and is presented here in order to give perspective for the more details figures discussed below.

Figure 9:
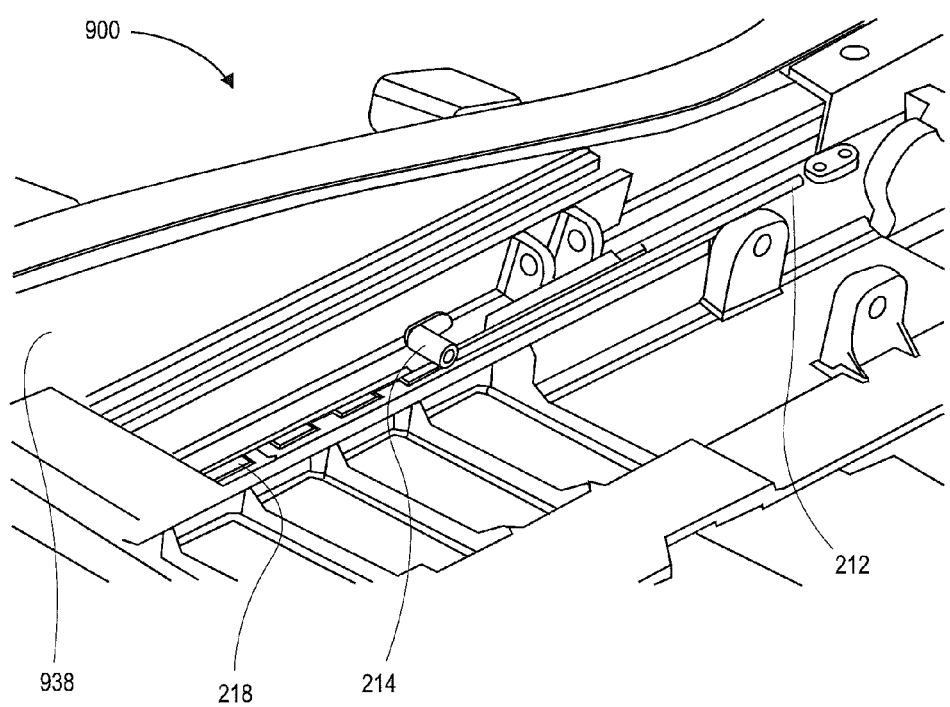
FIG. 9 illustrates a rod, track, and roller system in accordance with an embodiment.

FIG. 9 illustrates a rod, track, and roller skew sensing system in accordance with an embodiment of the invention. The skew sensing system 900 includes the roller 214, the transfer rod 212, and the guide track 218 described previously. The transfer rod 212 is connected to the VAFN section, and glides along the guide track 218, which is attached to the translating sleeve of the thrust reverser.

Figure 10:
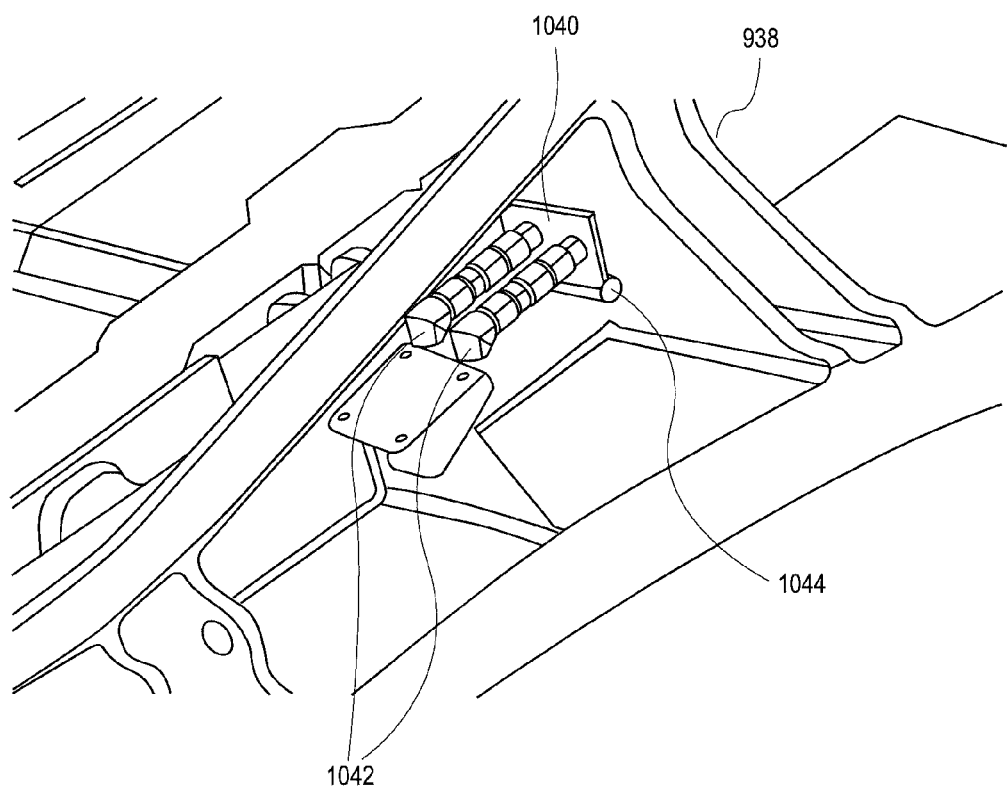
FIG. 10 illustrates proximity switches in accordance with an embodiment.

FIG. 10 illustrates position-sensing proximity switches in accordance with an embodiment of the invention. In the exemplary embodiment, two proximity switches 1042 are provided for redudancy; they both sense the same thing: the position of a metal flap 1040.

An axle 1044 of the crank that is connected to the roller 214 on the other side of the hinge beam 938 rotates the flap 1040 as the roller rides up and down on the guide track 218 (FIG. 9) of protrusions and notches. That is, FIG. 10 shows the opposite side of the beam 938 as compated to FIG. 9, and the axle 1044 is connected to the roller 214 by the crank 216 as show in FIGS. 2-7. Thus, the flap 1040 rotates and moves closer to or farther from the proximity switches 1042 as the foller rides in the guide track 218. As the flap rotates, the proximity switches generate their output signals with output corresponding to the flap position. Thus, simple proximity switches can be used to determine whether the roller is on a "hill" or in a "valley" of the guide track 218.

Figure 11:
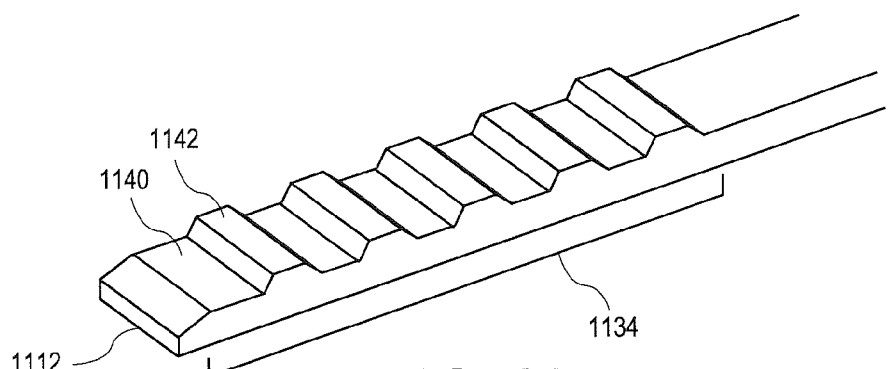
FIG. 11 illustrates a rod with a pattern of physical notches and protrusions in accordance with an embodiment.

FIGS. 11-14 illustrate rods with different, repeating patterns in accordance with embodiments. FIG. 11 illustrates a rod with a pattern of notches and protrusions. A rod 1112 has a mechanical pattern 1134, which includes notches 1140 and protrusions 1142. The physical notches and protrusions can be rolled over with a roller as shown in previous figures.

Figure 12:
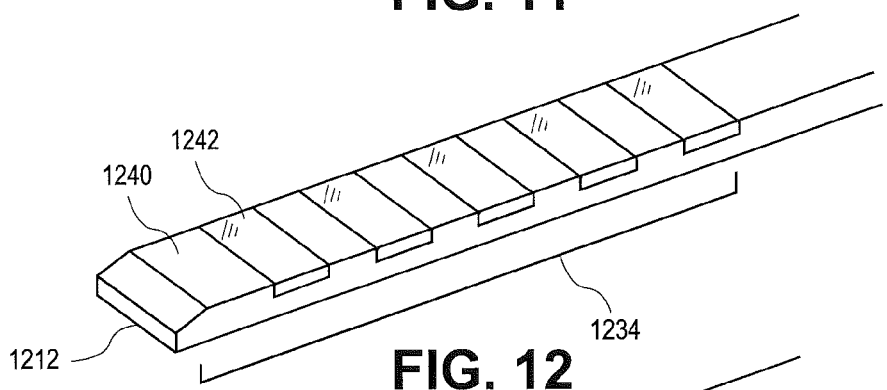
FIG. 12 illustrates a rod with a pattern of conductive couplers in accordance with an embodiment.

FIG. 12 illustrates a rod with a pattern of conductive couplers in accordance with an embodiment of the invention. A rod 1212 has a conductive pattern 1234, which includes nonconductive sections 1240 and conductive metal sections 1242. A conductive coupler sensor can determine the position of the rod by detecting whether current flows through a portion of the rod electrically connected with the sensor.

Figure 13:
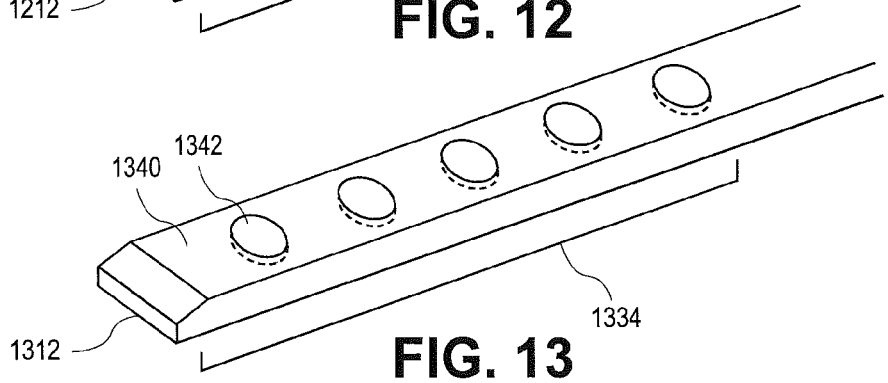
FIG. 13 illustrates a rod with a pattern of magnets in accordance with an embodiment.

FIG. 13 illustrates a rod with a pattern of magnets in accordance with an embodiment. A rod 1312 has a magnetic pattern 1334, which includes nonmagnetic sections 1340 and magnets 1342. A magnetic sensor can determine the position of the rod by detecting a magnetic field directly underneath the sensor.

Figure 14:
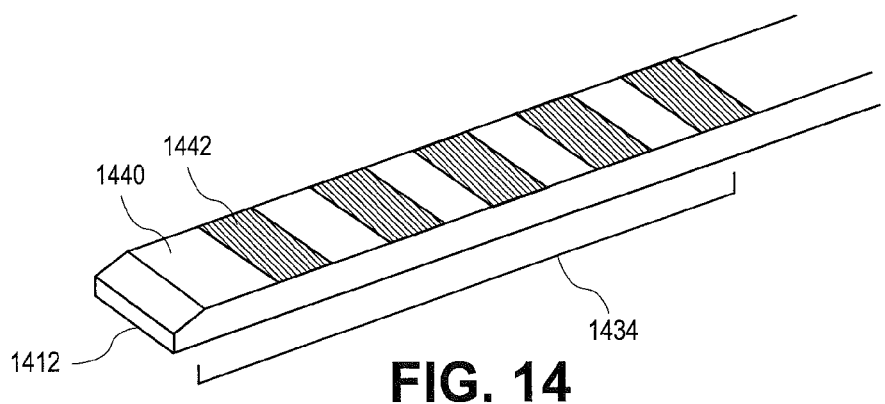
FIG. 14 illustrates a rod with a pattern of ink markings in accordance with an embodiment.

FIG. 14 illustrates a rod with a pattern of ink (or other visually detectable) markings in accordance with an embodiment. A rod 1412 has an optical pattern 1434, which includes light sections 1440 and dark sections 1442. An optical or infrared sensor can determine the position of the rod by detecting reflected light from the pattern.

Non-repeating patterns can be used as well. For example, a monotonically tapered shaft, or a series of ever-more-closely-spaced bar lines, can indicate an absolute position of the rod.

Figure 15:
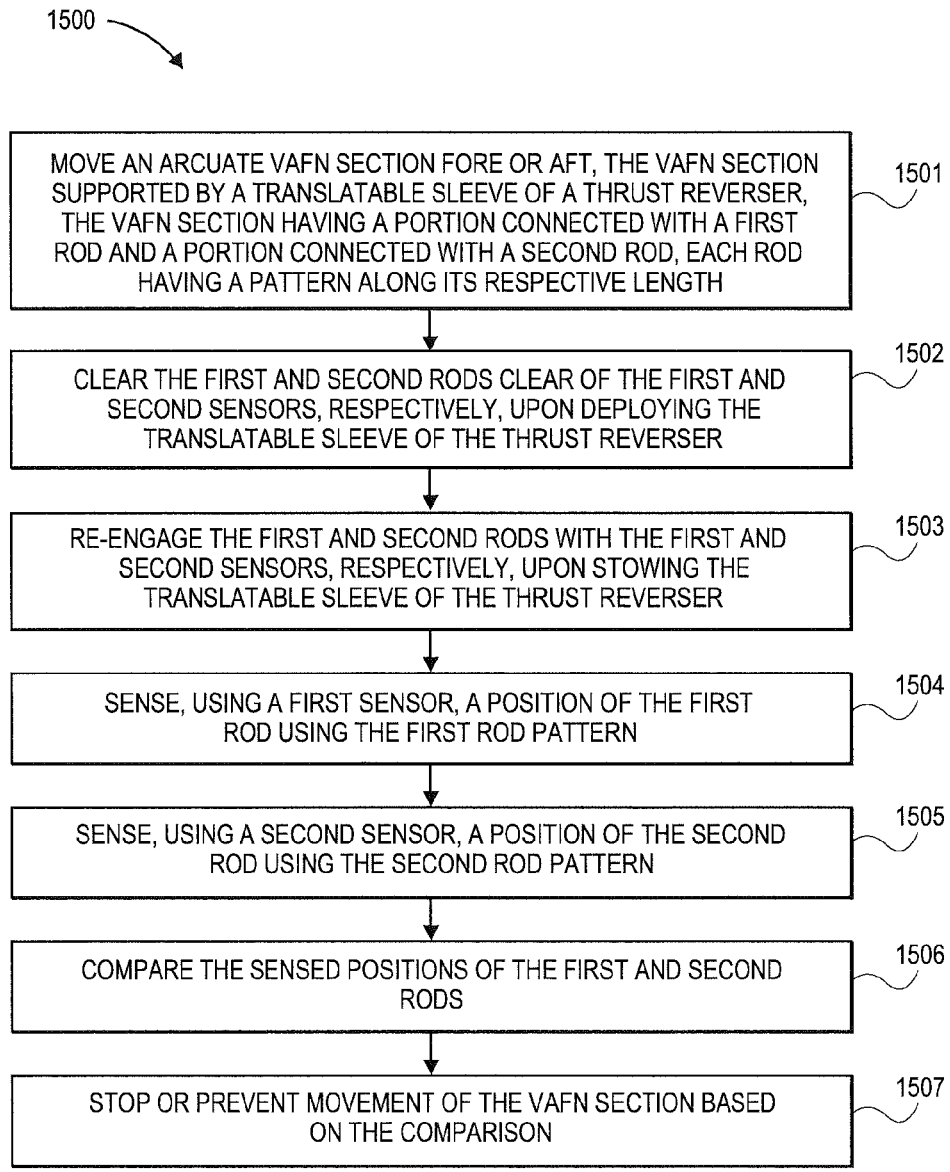
FIG. 15 is a flow chart of a process in accordance with an embodiment.

FIG. 15 is a flow chart of a process in accordance with an embodiment. The operations of the process 1500 can be performed in different orders as applicable. In the first operation 1501, an arcuate VAFN section is moved fore or aft, the VAFN section supported by a translatable sleeve of a thrust reverser, the VAFN section having a portion connected with a first rod and a portion connected with a second rod, each rod having a pattern along its respective length. In a second operation 1502, the first and second rods are cleared clear of the first and second sensors, respectively, upon deploying the translatable sleeve of the thrust reverser. In a third operation 1503, the first and second rods are re-engaged with the first and second sensors, respectively, upon stowing the translatable sleeve of the thrust reverser. In a fourth operation 1504, a first sensor is used to sense a position of the first rod using the first rod pattern. Next, in a fifth operation 1505, a second sensor is used to sense a position of the second rod using the second rod pattern. In a next operation 1506, the sensed positions of the first and second rods are compared. In the last operation 1507, the VAFN section is stopped or prevented from being moved based on the comparison Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims. Rods can be used for position sensing of the VAFN with or without a thrust reverser. When used with a thrust reverser, the rods can be on tracks attached to the thrust reverser that allow the rods to slide back and forth when the VAFN is moved, or the rods can be free from and not touch the thrust reverser.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A skew sensing apparatus for an aircraft engine variable area fan nozzle (VAFN) assembly, the apparatus comprising:
   an arcuate VAFN section;
   a translatable sleeve of a thrust reverser assembly that is moved between a stowed position and a deployed position, the arcuate VAFN section supported by the translatable sleeve and translatable with respect to the translatable sleeve:
   a first rod attached to a first portion of the VAFN section spanning along the translatable sleeve in a longitudinal direction, the first rod having a first pattern along a length of the first rod;
   a second rod attached to a second portion of the VAFN section and spanning along the translatable sleeve in the longitudinal direction, the second rod having a second pattern along a length of the second rod;
   a first sensor adapted to sense a position of the first rod using the first pattern;
   a second sensor adapted to sense a position of the second rod using the second pattern; and
   a circuit comparing the position of the first rod and the position of the second rod from the first sensor and the second sensor respectively and taking a corrective action when the skew is determined between the first rod and the second rod.

2. The apparatus of claim 1, wherein the first rod and the second rod are configured to move away from the first sensor and the second sensor when the translatable sleeve is moved to the deployed position, and are configured to be sensed by the first sensor and the second sensor when the translatable sleeve is moved to the stowed position.

3. The apparatus of claim 1, wherein the first pattern includes a repeating pattern having a wavelength of repetition, a half wavelength of the repeating pattern being less than a maximum distance for indicating a skewed VAFN configuration.

4. The apparatus of claim 1, wherein the first pattern includes a non-repeating pattern configured to allow the first sensor to determine an absolute position of the first rod.

5. The apparatus of claim 1, wherein:
   the first pattern of the first rod includes physical notches or protrusions on the first rod; and
   the first sensor includes a position-sensing switch.

6. The apparatus of claim 5, wherein the position-sensing switch includes a proximity sensor, the apparatus further comprising:
   a roller configured to contact the first pattern of the first rod;
   a crank coupled with the roller, an axle of the crank extending through a beam; and
   a flap coupled with the crank on a side of the beam opposite the roller, the crank configured to rotate the flap toward or away from the proximity sensor.

7. The apparatus of claim 1, wherein:
   the first pattern of the first rod includes conductive and non-conductive portions; and
   the first sensor includes a conductive coupler.

8. The apparatus of claim 1, wherein:
   the first pattern of the first rod includes markings; and
   the first sensor includes an optical or infrared detector.

9. The apparatus of claim 1, wherein:
   the first pattern of the first rod includes magnets; and
   the first sensor includes a magnetic field detector.

10. The apparatus of claim 1, wherein the first rod is coupled with a top portion of the arcuate VAFN section and the second rod is coupled with a bottom portion of the arcuate VAFN section.

11. The apparatus of claim 1, further comprising:
    a switch configured to prevent movement of the VAFN assembly based upon a signal from the circuit.

12. The apparatus of claim 1, wherein the first pattern and the second pattern are identical.

13. A method of sensing skew of an aircraft engine variable area fan nozzle (VAFN) assembly, the method comprising:
    moving an arcuate VAFN section fore or aft relative to the aircraft engine, the VAFN section movable between a stowed position and a deployed position with respect to the translatable sleeve in accordance with thrust reverser sleeve positions, the VAFN section having a first portion with a first rod and a second portion with a second rod, the first rod having a first pattern and the second rod having a second pattern along their respective length, wherein the first rod is attached to the first portion, and the second rod is attached to the second portion:
    sensing, using a first sensor, a position of the first rod using the first pattern;
    sensing, using a second sensor, a position of the second rod using the second pattern;
    comparing the sensed positions of the first rod and the second rod using data from the first sensor and the second sensor respectively; and
    preventing movement of the VAFN section based on the comparison, the preventing movement comprising taking a corrective action when the skew is determined between the first rod and the second rod.

14. The method of claim 13, further comprising: moving the first rod and the second rod away from the first sensor and the second sensor, respectively, upon moving the VAFN section to the deployed position; and engaging the first rod and the second rod with the first sensor and the second sensor, respectively, upon moving the VAFN section to the stowed position.

15. The method of claim 13, wherein the first pattern includes a repeating pattern having a wavelength of repetition, a half wavelength of the repeating pattern being less than a maximum distance for indicating a skewed VAFN.

16. The method of claim 13, wherein the first pattern includes a non-repeating pattern configured to allow the first sensor to determine an absolute position of the first rod.

17. The method of claim 13, wherein:
- the first pattern of the first rod includes physical notches or protrusions on the first rod; and
- the first sensor includes a position-sensing switch.

18. The method of claim 17, wherein sensing the position of the first rod comprises receiving a signal from a proximity switch and detecting a flap connected with a crank and roller, the method further comprising:
- rolling the roller over the physical notches or protrusions on the first rod.

19. The method of claim 13, wherein the first rod is coupled with a top portion of the arcuate VAFN section and the second rod is coupled with a bottom portion of the arcuate VAFN section.

\* \* \* \* \*